United States Patent
Tsuchitoi

(10) Patent No.: US 10,477,046 B2
(45) Date of Patent: Nov. 12, 2019

(54) IMAGE FORMING APPARATUS FOR DETERMINING A PRIORITY ORDER FOR DISPLAY OF USER AUTHENTICATION ICONS

(71) Applicant: CANON KABUSHIKI KAISHA, Tokyo (JP)

(72) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/143,168

(22) Filed: Sep. 26, 2018

(65) Prior Publication Data

US 2019/0104226 A1 Apr. 4, 2019

(30) Foreign Application Priority Data

Sep. 29, 2017 (JP) ................. 2017-189317

(51) Int. Cl.
G06F 3/12 (2006.01)
H04N 1/00 (2006.01)
H04N 1/44 (2006.01)

(52) U.S. Cl.
CPC ....... *H04N 1/00511* (2013.01); *G06F 3/1204* (2013.01); *G06F 3/1273* (2013.01); *H04N 1/4406* (2013.01); *H04N 2201/0094* (2013.01)

(58) Field of Classification Search
CPC .. H04N 1/00511; H04N 1/517; G06F 3/1273; G06F 3/1204
See application file for complete search history.

(56) References Cited

U.S. PATENT DOCUMENTS

| | | | | |
|---|---|---|---|---|
| 2001/0037294 A1* | 11/2001 | Freishtat | ................ | G06Q 20/10 705/39 |
| 2007/0247642 A1* | 10/2007 | Nakamura | .......... | G06F 3/04817 358/1.1 |
| 2008/0235776 A1* | 9/2008 | Nakatomi | ............. | G06F 21/608 726/7 |
| 2010/0290071 A1* | 11/2010 | Okada | ................ | H04N 1/00244 358/1.13 |
| 2016/0127610 A1* | 5/2016 | Ogawa | ................. | H04N 1/4413 358/1.13 |
| 2017/0013152 A1* | 1/2017 | Morii | .................. | H04N 1/00509 |
| 2017/0094121 A1* | 3/2017 | Mizuno | ................... | G06F 21/45 |
| 2017/0310834 A1* | 10/2017 | Yamanishi | ......... | H04N 1/00411 |
| 2018/0046505 A1* | 2/2018 | Saga | ....................... | G06F 9/461 |
| 2018/0063378 A1* | 3/2018 | Kogure | ............. | H04N 1/00068 |

FOREIGN PATENT DOCUMENTS

JP 2017-19197 A 1/2017

* cited by examiner

*Primary Examiner* — Benjamin O Dulaney
(74) *Attorney, Agent, or Firm* — Canon U.S.A., Inc., IP Division

(57) ABSTRACT

An image forming apparatus acquires an evaluation value of each user by using a combination of a plurality of criteria determined on the basis of usage history information, and determines priority order of users having a high possibility of using the image forming apparatus next time based on the acquired evaluation value.

17 Claims, 13 Drawing Sheets

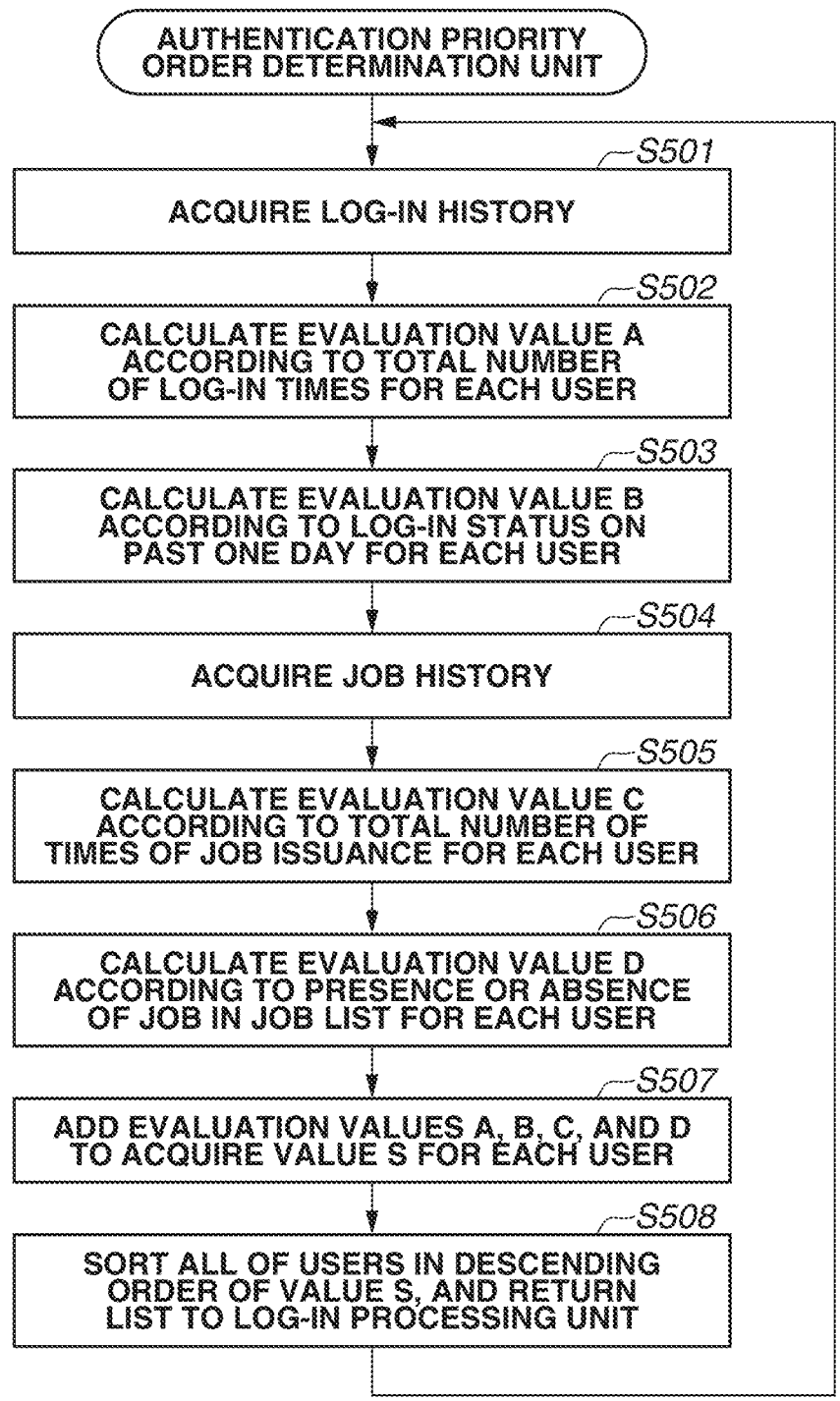

FIG.6A

2017/6/19 13:00 User1 LOGIN
2017/6/19 13:01 User1 LOGOUT
2017/6/20 9:00 User2 LOGIN
2017/6/20 9:05 User2 LOGOUT

FIG.6B

2017/06/17 15:00 User1 PRINT jobname1
2017/06/17 16:00 User2 PRINT jobname2

FIG.6C

User1 PRINTING jobname3
User2 HOLD jobname4
User3 HOLD jobname5

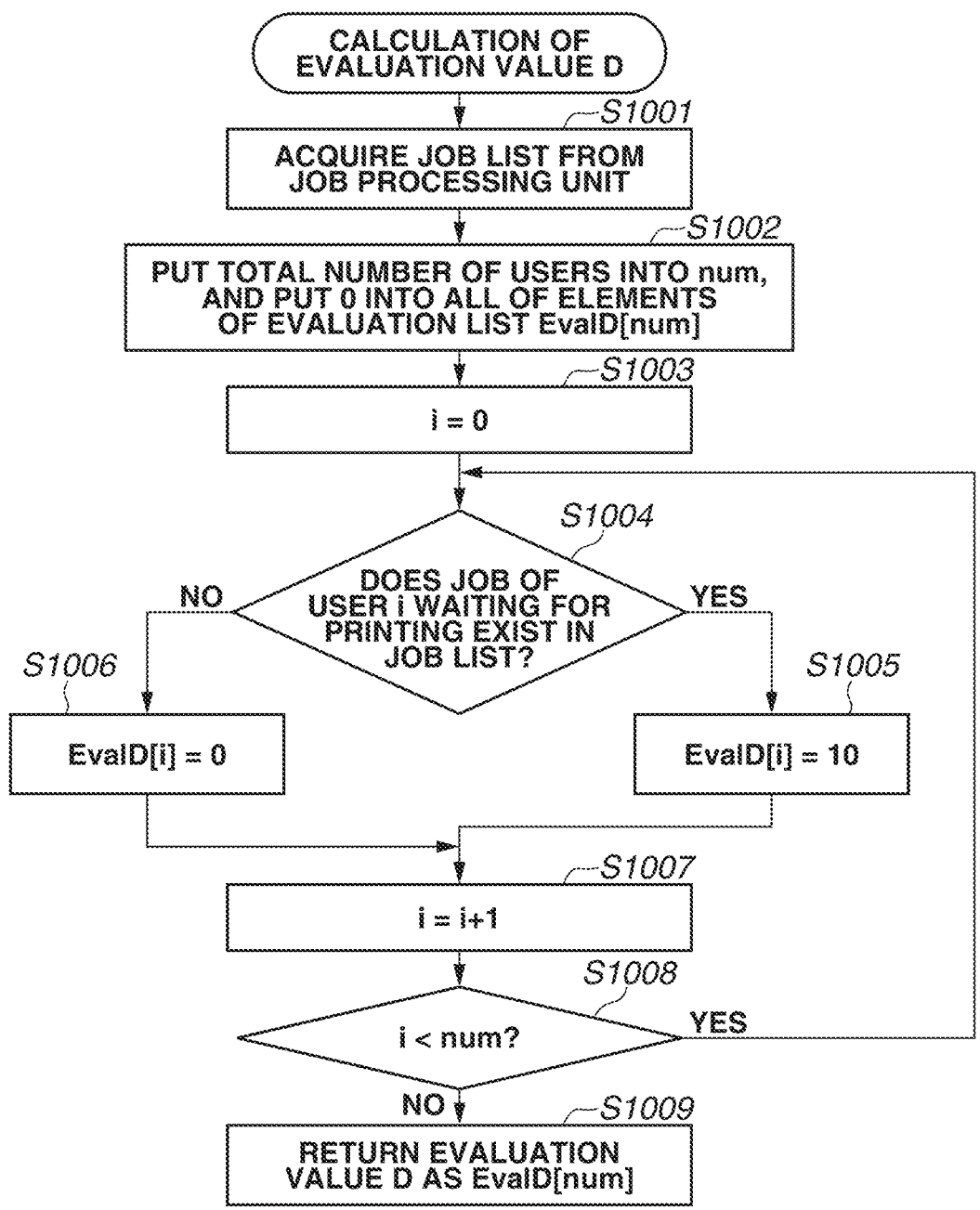

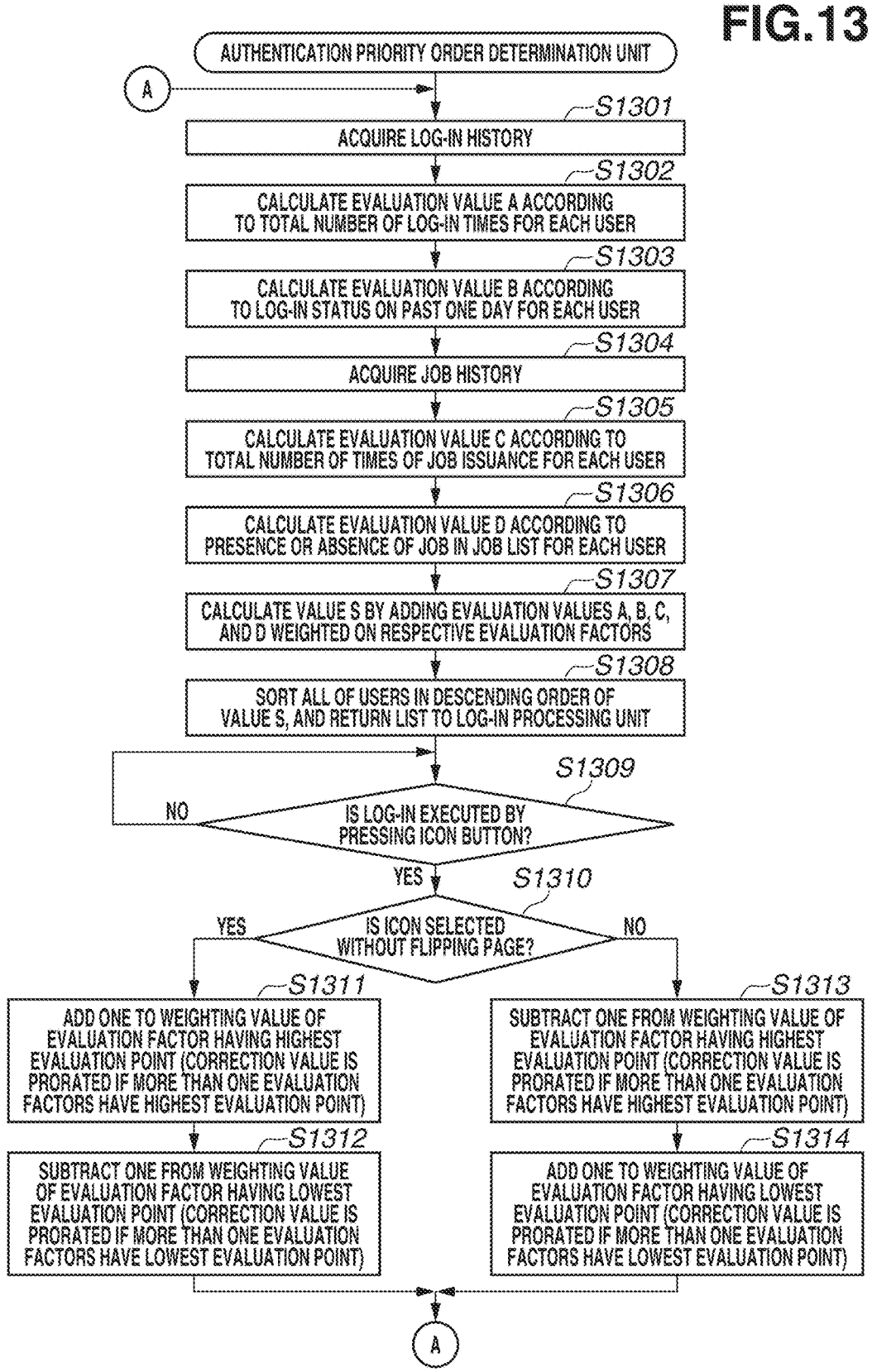

IMAGE FORMING APPARATUS FOR DETERMINING A PRIORITY ORDER FOR DISPLAY OF USER AUTHENTICATION ICONS

BACKGROUND

Field of the Invention

The present invention relates to an image forming apparatus shared by a plurality of users, a control method of the image forming apparatus, and a storage medium.

Description of the Related Art

In recent years, because an image forming apparatus such as a multifunction peripheral introduced into an office is used by a plurality of users, various functions have been realized, which identify the users and execute authentication (also referred to as "personalization") to enable utilization of the image forming apparatus with enhanced convenience.

For example, in printout processing, if a plurality of print jobs is transmitted from a host computer, the image forming apparatus does not output the print jobs instantly, but executes user identification/authentication processing to identify the print jobs transmitted from the user. Then, the image forming apparatus extracts only print jobs transmitted from the relevant user as output targets, and displays a list on an operation screen to prompt the user to output user's own print jobs only. With this function, the user can easily select the print jobs. Alternatively, a function of preferentially displaying user settings on the operation screen by recording functions or settings frequently used by each of the users has been also realized.

Although personalization is useful for improving the convenience, the user has to first execute personal identification/authentication. Generally, a method of identifying or authenticating a user with a user name and a password, which are input through an operation screen has been employed. However, inputting information through a keyboard is a problem because time and effort will be required for such an operation.

On the other hand, an authentication method using an authentication device such as a contactless integrated circuit (IC) card has been also employed frequently. However, the authentication device is not always an optimum method because it costs a user for each unit.

Recently, an authentication system has been realized, which provides a log-in screen for displaying icons of pre-registered users on an operation screen without input of the user name and allows a user to simply select an icon to execute log-in operation. This authentication system is referred to as "simple authentication".

In the simple authentication, an icon image unique to the registered user can be registered, and the user can visually recognize and select user's own icon from a plurality of icons displayed on the screen.

In the simple authentication, a user may be asked to input a password for authentication after selecting an icon if security has to be taken into consideration. However, authentication which does not have to input the password is also implemented if a user is only asked to execute personalization.

As described above, in the simple authentication, unlike the conventional authentication system, the user can execute personal identification/authentication without inputting the user's name and the password through a keyboard, and personalization unique to the user can be realized. Therefore, it is advantageous to improve convenience by simplifying the operation procedure.

On the other hand, if a number of registered users is increased to a certain number or more, it will become difficult to display icons of all the users on a single screen. In this case, the user has to display a next log-in screen by flipping or scrolling the log-in screen (authentication screen) on the operation screen several times to check whether the own icon exists in that screen. Therefore, operation or visual recognition will become complicated.

In order to address the above-described problems, a technique relating to the simple authentication is discussed in Japanese Patent Application Laid-Open No. 2017-19197. In the technique, a function of sorting a user list is employed by means of using one or more pieces of information from among history information of the user who has executed log-in operation in the past, ownership information of a registered print job, and usage frequency information of the user. The technique allow the user to easily execute personal identification.

SUMMARY OF THE DISCLOSURE

According to an aspect of the present invention, an image forming apparatus includes a management unit configured to manage usage history information about the image forming apparatus for each user, a priority order determination unit configured to determine an evaluation value for each user based on the usage history information using a plurality of different types of evaluation criteria applied to the usage history information, and to determine a priority order based on the determined evaluation value that predicts which users will use the image forming apparatus next time, and a log-in screen display unit configured to display an authentication icon of each user on a log-in screen, based on the priority order.

Further features of the present invention will become apparent from the following description of exemplary embodiments with reference to the attached drawings.

BRIEF DESCRIPTION OF THE DRAWINGS

FIG. 5 is a flowchart illustrating processing executed by an authentication priority order determination unit.

FIGS. 6A, 6B, and 6C are diagrams illustrating examples of a log-in history and a job history.

FIG. 10 is a flowchart illustrating calculation processing of an evaluation value D.

FIG. 13 is a flowchart illustrating processing executed by an authentication priority order determination unit according to the second exemplary embodiment.

DESCRIPTION OF THE EMBODIMENTS

In the conventional simple authentication, an icon of a user who uses an image forming apparatus can be identified by sorting a user list through a sorting function. However, even in the above case, the user still has difficulty in finding his own icon unless an appropriate sorting method is selected. Further, operation of the user will become complicated because the sorting method has to be selected.

An advantage of some aspects of the present invention is to provide a solution to the above-described problem.

Aspects of the present invention are directed to an image forming apparatus, a control method, and a program which enable a user to easily select his own icon in the simple authentication in which user identification/authentication is executed by selecting user's own icon from a displayed log-in screen.

An exemplary embodiment of the present invention will be illustratively described in detail below with reference to the appended drawings. However, the constituent elements described in the below-described exemplary embodiment are merely examples, and are not intended to limit the scope of the present invention.

In the following exemplary embodiment, an exemplary embodiment in which the present invention is applied to an image forming apparatus such as a multifunction peripheral or a printer will be described.

A first exemplary embodiment embodying will be described with reference to the appended drawings.

Figure 1:
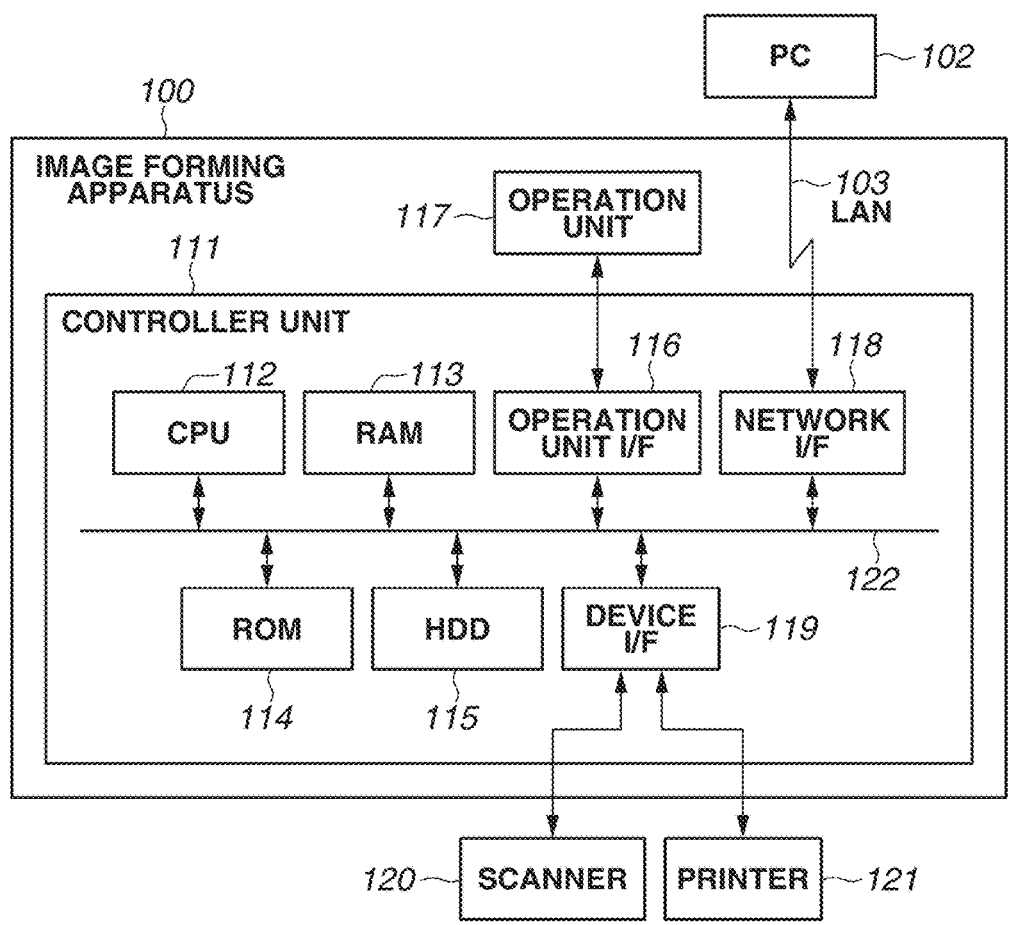
FIG. 1 is a block diagram schematically illustrating a physical configuration of an image forming apparatus according to a first exemplary embodiment of the present invention.

FIG. 1 is a block diagram schematically illustrating a physical configuration of an image forming apparatus according to the present exemplary embodiment. In an image forming apparatus 100 in FIG. 1, a controller unit 111 generally controls operation of the entire image forming apparatus 100, and a local area network (LAN) 103 connects the controller unit 111 to an external apparatus. Within the controller unit 111, a central processing unit (CPU) 112 controls operations of each unit included in the controller unit 111. A random access memory (RAM) 113 temporarily stores information such as a state of the image forming apparatus 100 and images, a read only memory (ROM) 114 stores a main program to be executed by the CPU 112, and a hard disk drive (hereinafter referred to as "HDD") 115 stores image information and device setting information as an auxiliary storage device.

An operation unit interface (hereinafter referred to as "operation unit I/F") 116 communicates with an operation unit 117 to transmit/receive user interface information, and the operation unit 117 accepts various user operations executed on the image forming apparatus 100. A network I/F 118 communicates with a host computer (PC) 102 serving as an external device via the LAN 103. A device I/F 119 communicates with various devices of the image forming apparatus 100 and also communicates with a scanner 120 and a printer 121. The scanner 120 uses an optical scanning technique to read a document and convert the document into image data, and the printer 121 prints the image data on a sheet by employing a printing technique such as a known electro-photographic technique.

Figure 2:
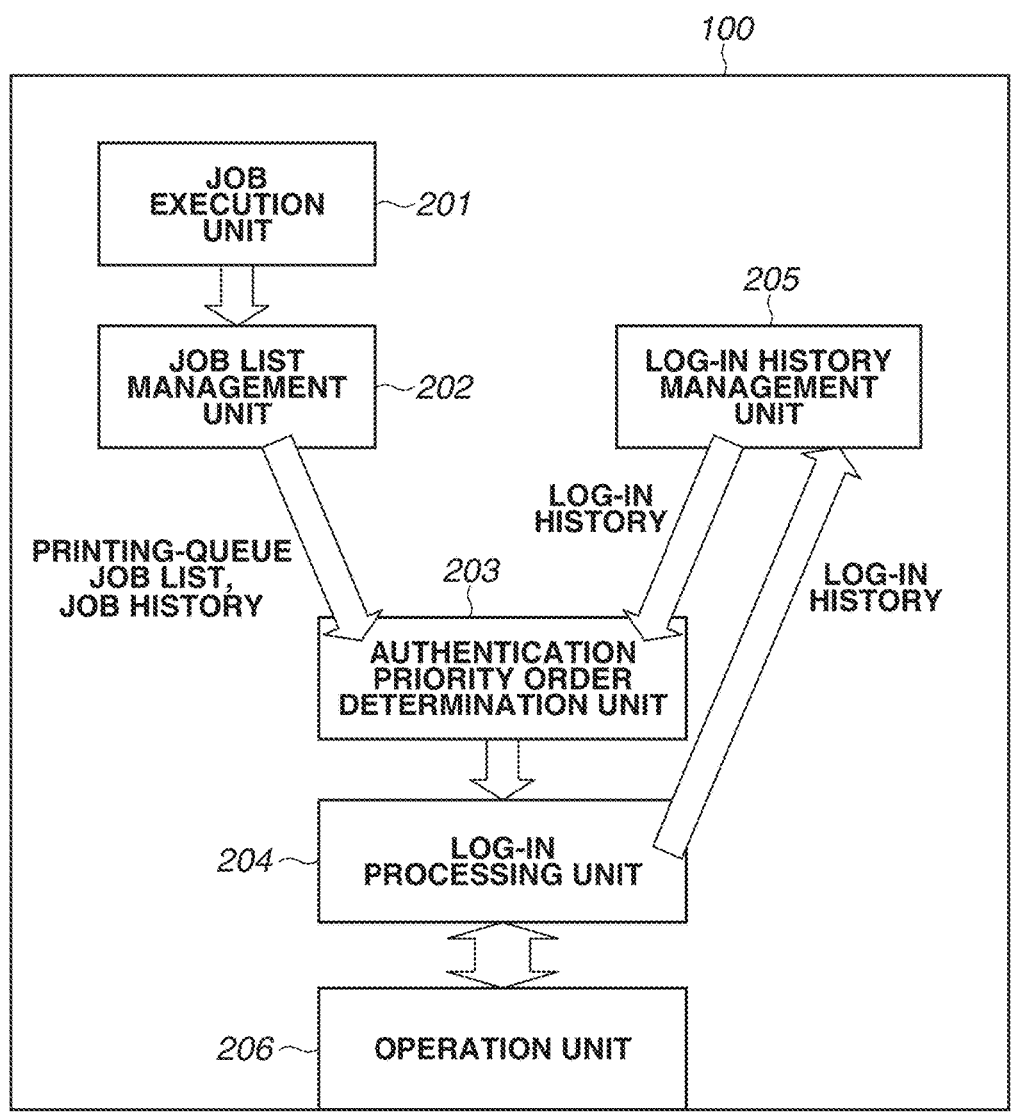
FIG. 2 is a block diagram schematically illustrating a logical configuration of the image forming apparatus according to the first exemplary embodiment.

FIG. 2 is a block diagram illustrating a logical configuration mainly relating to log-in processing of the image forming apparatus 100 according to the present exemplary embodiment. The logical configuration in FIG. 2 is realized with a program executed by the CPU 112 and a storage device such as the RAM 113 illustrated in FIG. 1. In the image forming apparatus 100 in FIG. 2, a job execution unit 201 analyzes a print job received from the host computer 102 via the network I/F 118 to generate image data. Then, in response to a print job output instruction, the job execution unit 201 prints image data onto a sheet by employing a printing technique such as a known electrophotographic technique.

A job list management unit 202 stores a printing history of print processing executed by the job execution unit 201 or a list of print jobs in a printing queue, and the authentication priority order determination unit 203 determines a display priority order of authentication icons to be displayed on a screen when authentication is executed. A log-in processing unit 204 identifies and authenticates a user who uses the image forming apparatus 100. The log-in processing unit 204 also functions as a log-in screen display unit which arranges and displays user icons on a log-in screen according to the display priority order.

A log-in history management unit 205 stores a log-in history of a user who has executed log-in operation. An operation unit 206 accepts icon selection operation executed by a user who is to be authenticated, or accepts the print job output instruction or a log-out instruction input by a user. The operation unit 206 corresponds to the operation unit 117 in FIG. 1. A job list management unit 202 and a log-in history management unit 205 function as management units for managing usage history information of each user.

Figure 3A:
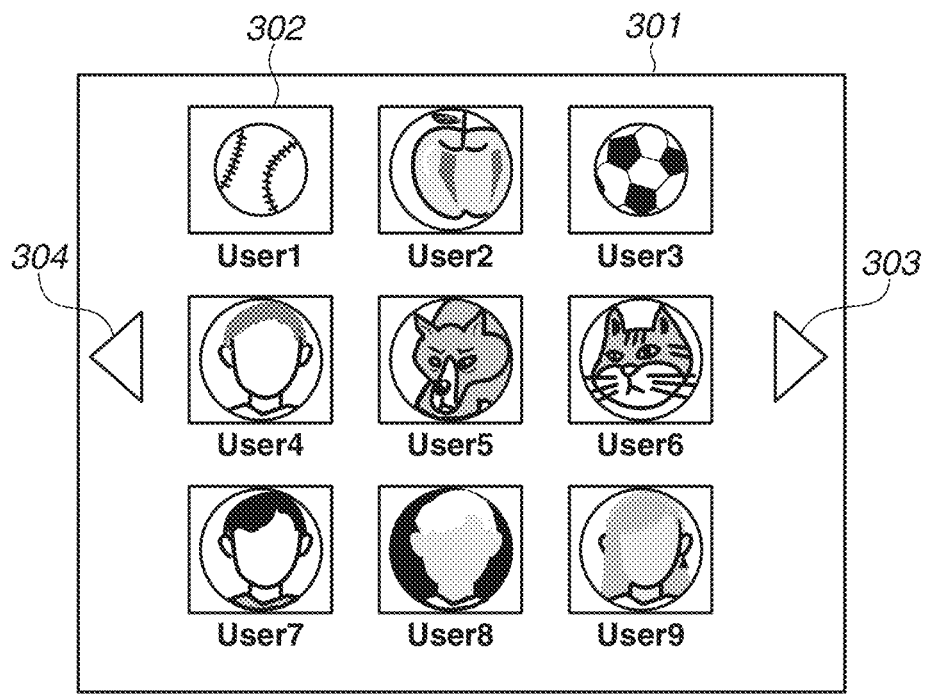
FIGS. 3A and 3B are diagrams illustrating examples of a log-in screen displayed on an operation unit when log-in operation is executed.
Figure 3B:
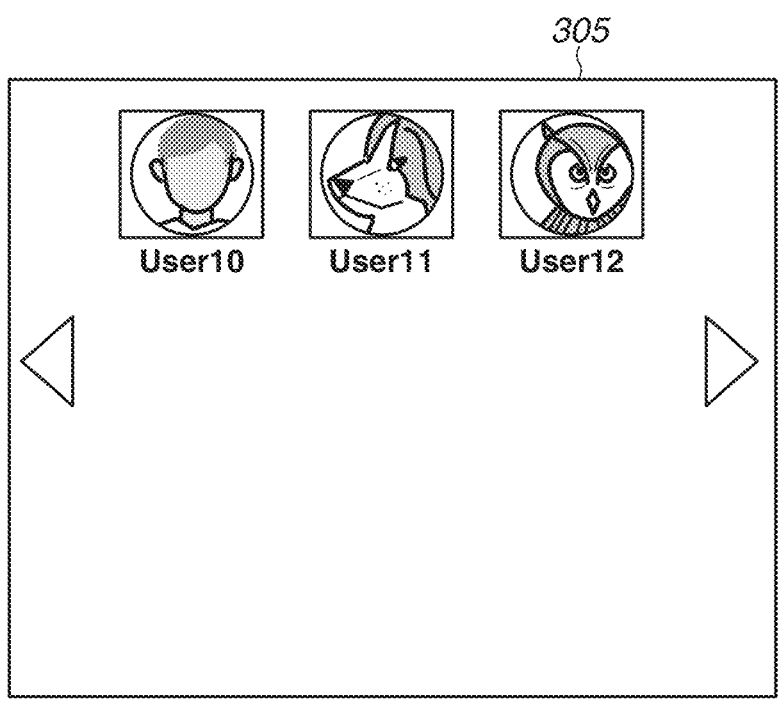

FIGS. 3A and 3B are user interface (UI) diagrams illustrating examples of a log-in screen (authentication log-in screen) displayed on the operation unit 117 (206) when log-in operation is to be executed. The operation unit 117 is a user interface such as a liquid crystal panel which can be used for displaying an image and executing input operation.

Icons 302 corresponding to each user are displayed on a log-in screen 301 in FIG. 3A which is firstly displayed when log-in operation is to be executed. A user name (e.g., "User 1") is displayed under each of the icons 302. In this example, a total of 9 icons can be displayed on the log-in screen 301. In order to achieve optimum operability, a number of displayable icons is determined according to a size of the screen and a size of the icon. If a large number of users are registered, and all icons 302 cannot be displayed on the log-in screen 301, the user can switch the page (screen) by operating a page flipping button 303 or 304. A screen 305 in FIG. 3B is an example of a next log-in screen that is displayed when the page is flipped by the page flipping button 303.

For example, when a user named as "User 11" selects an icon, the user can switch the log-in screen 301 to the next log-in screen 305 by pressing the page flipping button 303 if user's own icon cannot be found in the log-in screen 301. In the present exemplary embodiment, only two screens are switched from one another. However, if one hundred users are registered, the user has to press the page flipping button 303 over and over again in order to reach "User 100", so that operability will be lowered. Therefore, aspects of the present invention, in order to improve operability, icons of users who are expected to have a high possibility of executing log-in operation are displayed on the log-in screen in order of higher priority.

In order to predict priority order of users having the high possibility of executing log-in operation, various evaluation criteria, i.e., evaluation factors, are used, and priority order are determined based on overall points acquired from a result of the evaluation, so that the priority order can be predicted more precisely.

In the present exemplary embodiment, prediction is executed by using the following evaluation factors.
1. A total number of log-in times (total log-in) within a predetermined period is taken as an evaluation factor because a user who has frequently logged in the image forming apparatus is likely to log in again.
2. Use of the image forming apparatus in a predetermined period, e.g., past one day, is taken as an evaluation factor because a user is likely to use the image forming apparatus again if the user has used the image forming apparatus once.
3. A total number of job issuance times is taken as an evaluation factor because a user who has frequently instructed the image forming apparatus to transmit a print job, i.e., a user who has frequently instructed the image forming apparatus to issue (input) a print job, is likely to use the image forming apparatus again.
4. Presence or absence of a print job in an output queue is taken as an evaluation factor because a print job currently retained in the image forming apparatus is likely to be printed instantly if that print job is waiting for an output instruction.

The above descriptions are examples of evaluation factors, and another factor such as a number of scanning times may also be employed.

Subsequently, a time-sequence flow in the image forming apparatus of the present exemplary embodiment, mainly relating to processing of determining display order of the authentication icons on the log-in screen, will be described.

Figure 4:
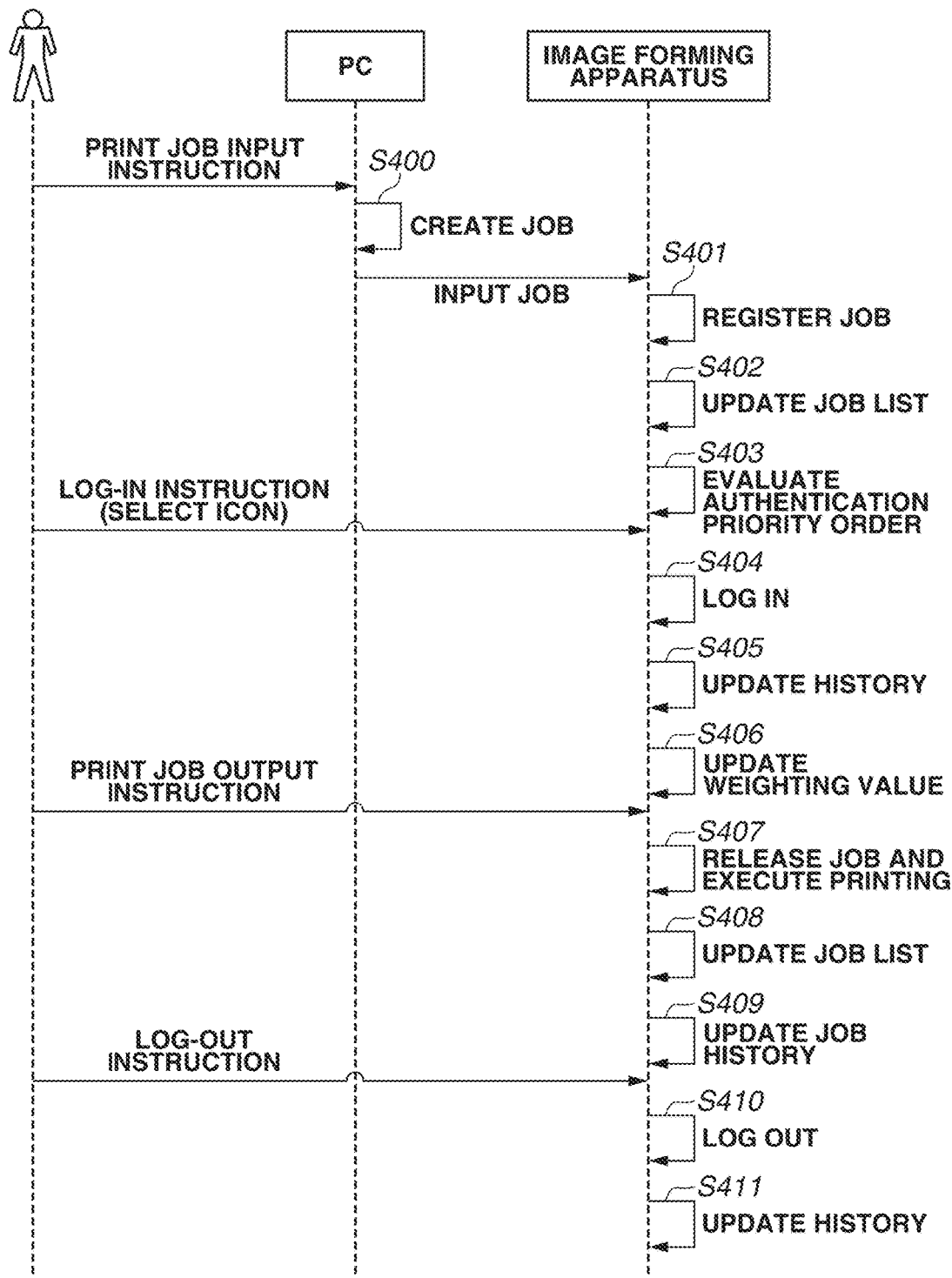
FIG. 4 is a sequence diagram illustrating an operation flow of the image forming apparatus according to the first exemplary embodiment.

FIG. 4 is a sequence diagram illustrating an operation flow using the image forming apparatus 100 according to the present exemplary embodiment, mainly illustrating a time-sequence processing flow of determining display order of the authentication icons when the log-in operation is executed.

A program operating on the image forming apparatus 100 according to the sequence diagram is stored in the ROM 114 in FIG. 1, read out to the RAM 113, and executed by the CPU 112. The same can be also said for the other flowcharts described below. In following exemplary embodiments, a symbol "S" represents "step".

In FIG. 4, a line on the left side represents operation executed by the user, a line in the middle represents processing executed by the host computer (PC) 102, and a line on the right side represents processing executed by the image forming apparatus 100.

In step S400, when the user instructs the host computer 102 to input a print job, the host computer 102 creates a print job by using software for generating an image. In step S401, when the host computer 102 inputs the print job to the image forming apparatus 100, the image forming apparatus 100 executes registration of the print job. In step S402, because the print job is registered, the image forming apparatus 100 updates the job list.

When the user approaches the image forming apparatus 100 to execute log-in operation, the authentication priority order is previously evaluated by the image forming apparatus 100 in step S403, so that the icons used for the log-in operation is rearranged. In step S404, when the user inputs a log-in instruction by selecting an icon from the log-in screen, the image forming apparatus 100 executes log-in processing. Then, in step S405, the image forming apparatus 100 updates the log-in history.

When the logging-in user instructs the image forming apparatus 100 to output the print job, in step S407, the image forming apparatus 100 releases and prints the print job. Because the print job does not exist when printing is completed, in step S408, the image forming apparatus 100 updates the job list. Further, in step S409, the image forming apparatus 100 updates the job history of the completed print job. In step S410, when the user inputs a log-out instruction to the image forming apparatus 100, the image forming apparatus 100 executes log-out processing. Then, in step S411, the image forming apparatus updates the log-in history.

The usage history information such as the job list, the job history, and the log-in history of each user updated through the above-described processing are entirely reflected in the evaluation factor as described below.

The sequence diagram in FIG. 4 is only one example, and thus a plurality of operations may be executed concurrently if the image forming apparatus 100 is used by a plurality of users. In any of the above cases, when the usage history information such as the job list, the job history, and the log-in history are changed, the authentication priority order is evaluated based on the change in step S403.

Further, the processing of step S406 in FIG. 4 is processing described in the second exemplary embodiment, and a weighting value to be described below is updated according to whether the user flips the page of the log-in screen displaying the icons when log-in operation is executed. This weighting update processing in step S406 is reflected in the evaluation factor described in the second exemplary embodiment.

FIG. 5 is a flowchart illustrating processing executed by the authentication priority order determination unit 203 in FIG. 2. The authentication priority order determination unit 203 for determining priority order starts processing along with the activation of the image forming apparatus 100, and operates continuously and constantly until the power is shut off. Further, this processing is executed at timing of the authentication priority order evaluation processing in step S403 of FIG. 4.

First, in step S501 of FIG. 5, the log-in history is acquired from the log-in history management unit 205. The log-in history is information about when and by whom log-in/log-out operation is executed.

FIG. 6A is a list illustrating an example of the log-in history. In the example in FIG. 6A, a User1 has logged in at 13:00 and logged out at 13:01 on 19 Jun. 2017. Further, a User2 has logged in at 9:00 and logged out at 9:05 on 20 Jun. 2017. While in the above example, the log-in history is described in a text format, the log-in history may be stored in a binary format.

In step S502, an evaluation value A according to a total number of log-in times in a predetermined period is calculated for each user. A calculation method of the evaluation value A will be described below. In step S503, an evaluation value B according to a log-in status in a predetermined period, e.g., one past day (24 hours), is calculated for each user. A calculation method of the evaluation value B will be described below. In step S504, the job history is acquired from the job list management unit 202.

FIG. 6B is a list illustrating an example of the job history. In the example in FIG. 6B, the User1 has output a print job at 15:00 on 17 Jun. 2017, and the User2 has output a print job at 16:00 on 17 Jun. 2017.

FIG. 6C is a diagram illustrating an example of the job list. In the example in FIG. 6C, a print job jobname3 retained by the User1 is being printed, and print jobs jobname4 and jobname5 held by the User2 and the User3 are waiting for printing operation.

In step S505, an evaluation value C according to a total number of times of job issuance is calculated for each user. A calculation method of the evaluation C will be described below. In step S506, an evaluation value D according to presence or absence of a job in the print list, i.e., presence or absence of a print job in an output queue, is calculated for each user. A calculation method of the evaluation value D will be described below.

In step S507, predetermined calculation such as addition for acquiring a total value is executed on the evaluation values A to D for each user, and an evaluation value S (total evaluation value S) is acquired. In step S508, all of the users are sorted in descending order of values S, and the sorting result is returned to the log-in processing unit 204.

Figure 7:
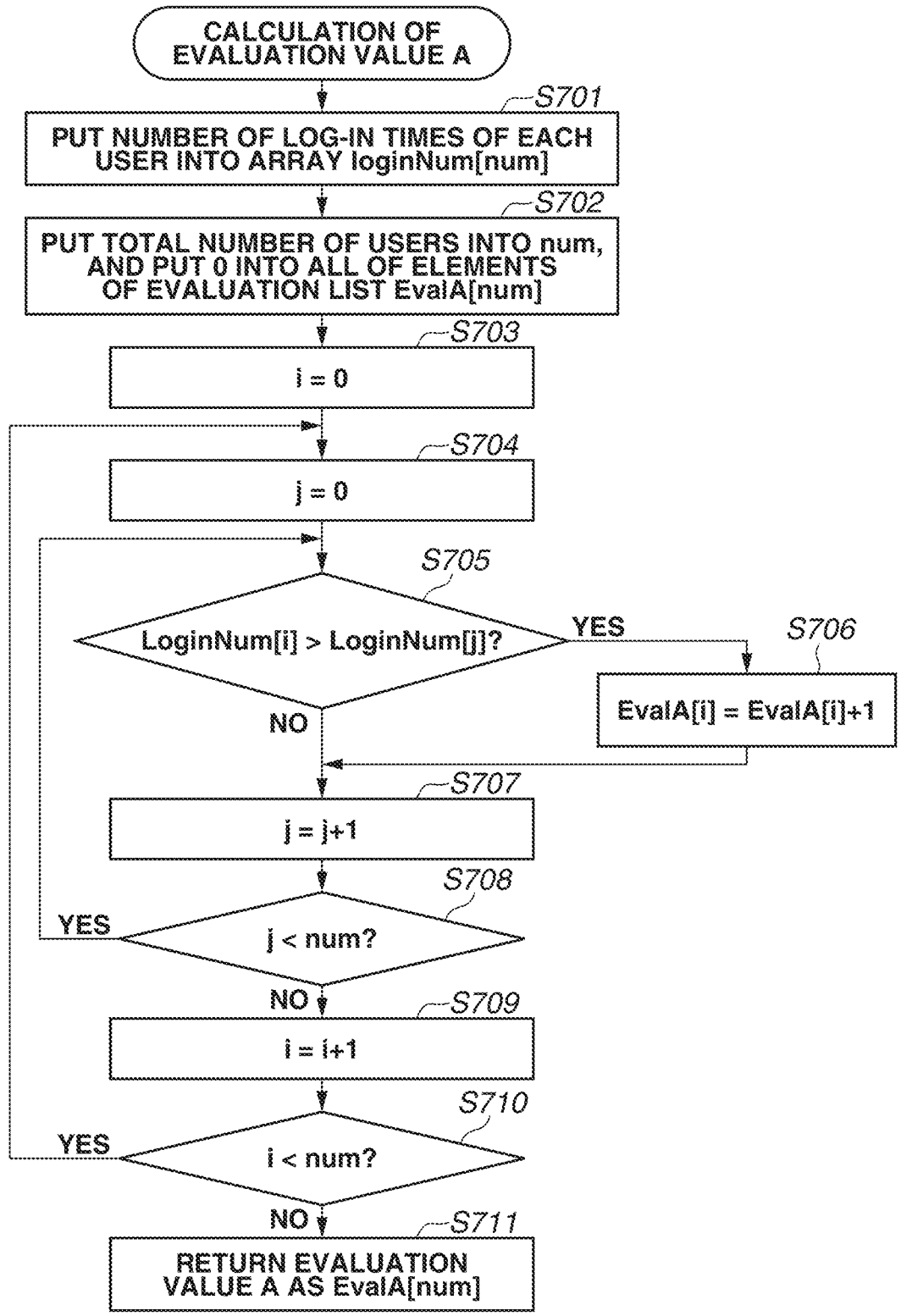
FIG. 7 is a flowchart illustrating calculation processing of an evaluation value A.

A typical example of a calculation method of each evaluation factor will be described. FIG. 7 is a flowchart illustrating calculation processing of the evaluation value A. This flowchart corresponds to the processing in step S502 in FIG. 5, and the processing is executed by branching from step S502.

In step S701 in FIG. 7, a total number of log-in times of each user is put into a loginNum[num] from the log-in history. The loginNum[num] is a list of each user such as the users User1 and User2 in a one-dimensional array. Herein, a number of times each user has executed log-in operation in the past is calculated from the log-in history, and the calculated value is put into the list of each user. In step S702, a total number of users is specified as "num" and each element of a one-dimensional array EvalA[num] for inputting an evaluation result of the evaluation value A is initialized by 0.

In step S703, a variable i is initialized to 0. In step S704, a variable j is initialized to 0. Herein, the variables i and j are identification numbers (integers) respectively representing the User1 and the User2.

In step S705, the authentication priority order determination unit 203 determines whether LoginNum[i] is greater than LoginNum[j]. If the determination result is "YES" (YES in step S705), the processing proceeds to step S706. In step S706, the evaluation value EvalA[i] is incremented to EvalA[i] +1. In other words, if the total number of log-in times LoginNum[i] of the evaluation-target user (i=0) is greater than the total number of log-in times LoginNum[j] of another user (j=0), addition is executed on the evaluation value EvalA[i] of the evaluation-target user, and the processing proceeds to step S707. If the determination result is "NO" (NO in step S705), the processing simply proceeds to step S707.

In step S707, the variable j is incremented. In step S708, the authentication priority order determination unit 203 determines whether the variable j is less than the total number of users "num". If the determination result is "YES" (YES in step S708), the processing in steps S705 to S708 is executed repeatedly. In step S708, if the variable j reaches the total number of users "num", and the determination result is "NO" (NO in step S708), the current evaluation value EvalA[i] acquired in previous step S705 or S706 is taken as the evaluation value A of the user (i=0). As described above, the evaluation value EvalA[i] is increased and becomes greater than the evaluation value of another user if the number of log-in times of the relevant user is greater.

If the determination result in step S708 is "NO", the processing proceeds to step S709. In step S709, the variable i is incremented to i+1 (herein, "i=1"). Then, in step S710, the authentication priority order determination unit 203 determines whether the incremented variable i is less than the total number of users "num". If the determination result is "YES" (YES in step S710), the processing in steps S704 to S710 is repeatedly executed with respect to the user (i=1), and the evaluation value A of the user (i=1) is acquired. As described above, the evaluation values A of the respective users are acquired sequentially.

In step S710, if the variable i reaches the total number of users num, and the determination result is "NO" (NO in step S710), the processing proceeds to step S711. In step S711, EvalA[i] as the acquired evaluation values A of all users (i=0 to num-1) is returned to the log-in processing unit 204 as EvalA[num].

Figure 8:
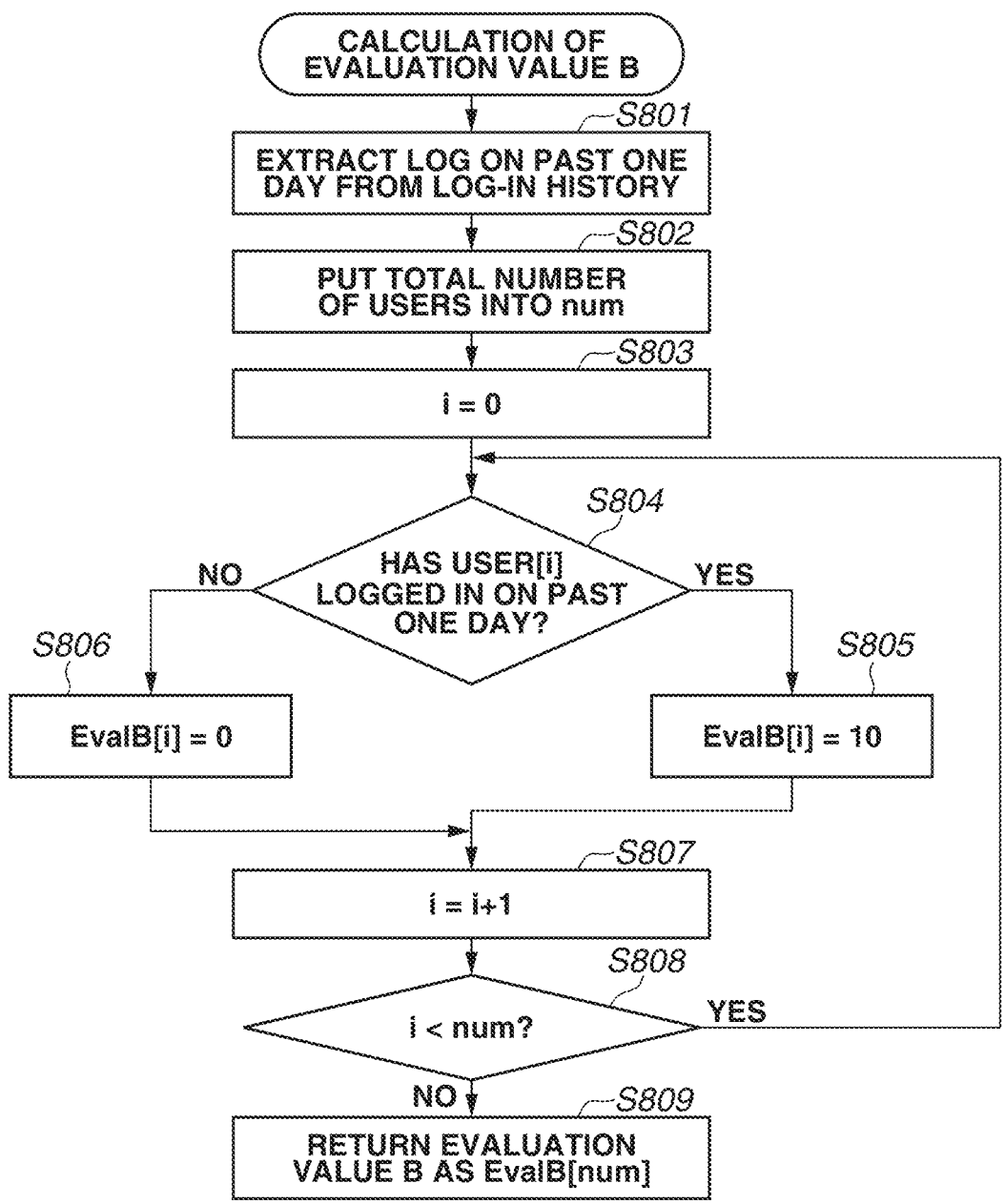
FIG. 8 is a flowchart illustrating calculation processing of an evaluation value B.

FIG. 8 is a flowchart illustrating calculation processing of the evaluation value B. This flowchart corresponds to the processing in step S503 in FIG. 5, and the processing is executed by branching from step S503.

In step S801, a log of one past day of each user is extracted from the log-in history. In step S802, a total number of users is specified as "num". In step S803, the variable i is initialized to 0. In step S804, the authentication priority order determination unit 203 executes searching to find out whether the user i (herein, "i=0") has executed log-in operation on the one past day. If the user i has executed log-in operation (YES in step S804), the processing proceeds to step S805. In step S805, for example, EvalB[i] as the evaluation value B of the user i (i=0) is evaluated as 10 points. Herein, in order to equalize the weight of the points with another evaluation factor A, the evaluation value is set to 10 points because the number of users is approximately 10. Accordingly, the evaluation value may be greater if the number of users is greater. On the other hand, if the user has not executed log-in operation (NO in step S804), the processing proceeds to step S806. In step S806, EvalB[i] as the evaluation value B of the user (i=0) is evaluated as 0.

In step S807, the variable i is incremented to i+1 (herein, i=1). In step S808, the authentication priority order determination unit 203 determines whether the incremented variable i is less than the number of users "num". If the determination result is "YES" (YES in step S808), the processing in steps S804 to S808 is executed repeatedly with respect to the user (i=1), and the evaluation value B of the user (i=1) is acquired. Thus, the evaluation values B of the respective users are sequentially acquired.

In step S808, if the variable i reaches the total number of users "num" and the determination result is "NO" (NO in step S808), the processing proceeds to step S809. In step S809, EvalB[i] as the acquired evaluation values B of all users (i=0 to num-1) is returned to the log-in processing unit 204 as EvalB[num].

Figure 9:
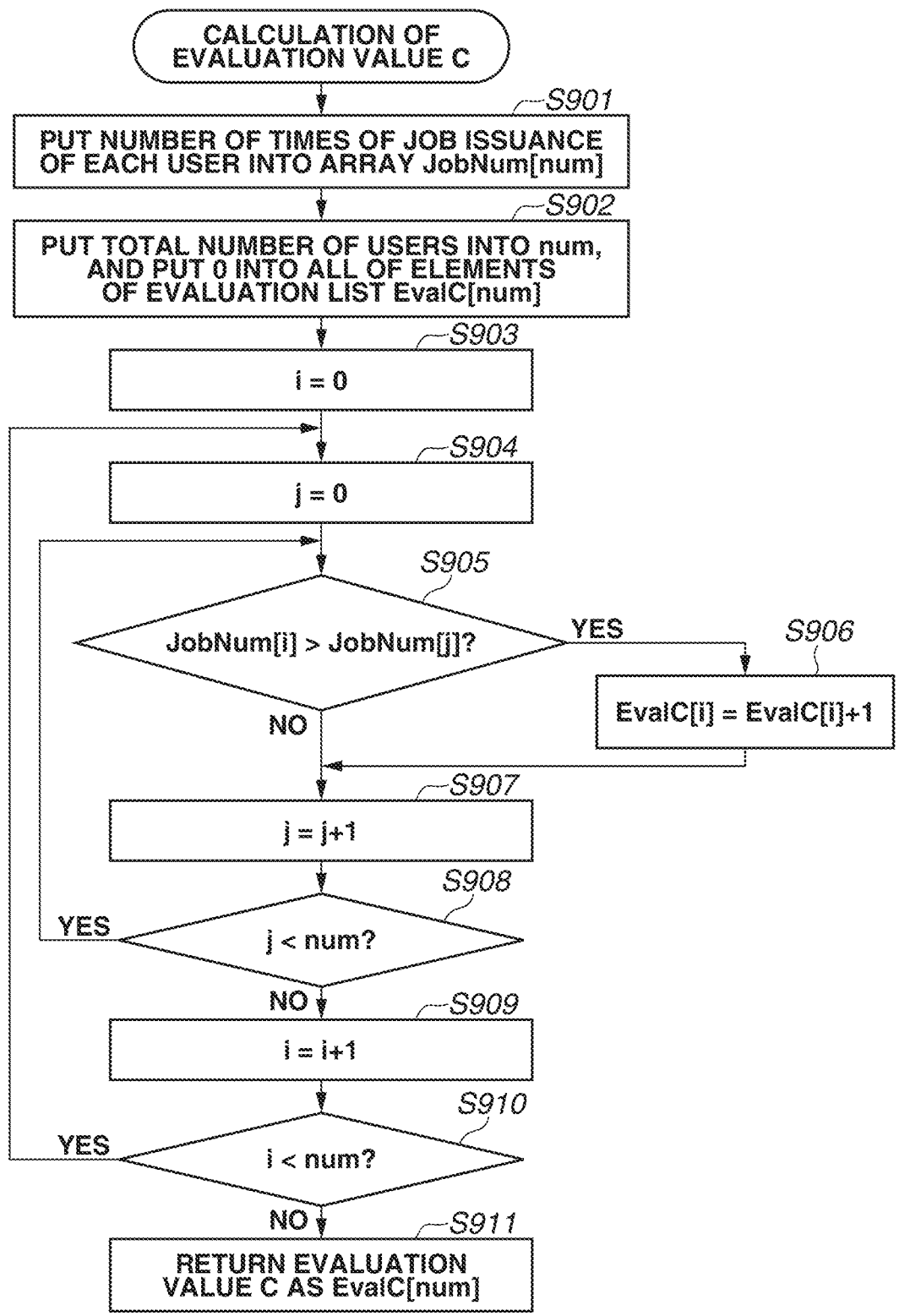
FIG. 9 is a flowchart illustrating calculation processing of an evaluation value C.

FIG. 9 is a flowchart illustrating calculation processing of the evaluation value C. This flowchart corresponds to the processing in step S505 in FIG. 5, and the processing is executed by branching from step S505.

In step S901, a number of job issuance times of each user is put into a JobNum[num] from the job history. The JobNum[num] is a list of each user, User1, User2 etc., in a one-dimensional array. Herein, a number of times of past job issuance from each user, i.e., a number of times of print job transmission to the image forming apparatus 100, is calculated from the job history, and the calculated value is put into the list of each user. In step S902, a total number of users is specified as "num" and respective elements of a one-dimensional array EvalC[num] for inputting an evaluation result of the evaluation value C is initialized by 0.

In step S903, the variable i is initialized to 0. In step S904, the variable j is initialized to 0. In step S905, the authentication priority order determination unit 203 determines whether JobNum[i] is greater than JobNum[j]. If the determination result is "YES" (YES in step S905), the processing proceeds to step S906. In step S906, the evaluation value EvalC[i] is incremented to EvalC[i]+1. In other words, if the total number of times of job issuance JobNum[i] of the evaluation-target user (i=0) is greater than the total number of times of job issuance JobNum[j] of another user (j=0), addition is executed on the evaluation value EvalC[i], and the processing proceeds to step S907. If the determination result is "NO" (NO in step S905), the processing simply proceeds to step S907.

In step S907, the variable j is incremented. In step S908, the authentication priority order determination unit 203 determines whether the variable j is less than the total number of users "num". If the determination result is "YES" (YES in step S908), the processing in steps S905 to s908 is repeatedly executed. In step S908, if the variable j reaches the total number of users "num" and the determination result is "NO" (NO in step S908), the current evaluation value EvalC[i] acquired in previous step S905 or S906 is taken as the evaluation value C of the user (i=0). Thus, the evaluation value EvalC[i] is increased and becomes greater than the evaluation value of another user if the number of times of job issuance of the user is greater.

If the determination result in step S908 is "NO", the processing proceeds to step S909. In step S909, the variable i is incremented to i+1 (herein, "i=1"). Then, in step S910, the authentication priority order determination unit 203 determines whether the incremented variable i is less than the total number of users num. If the determination result is "YES" (YES in step S910), the processing in steps S904 to S910 is repeatedly executed with respect to the user (i=1), and the evaluation value C of the user (i=1) is acquired. Thus, the evaluation values C of the respective users are sequentially acquired.

In step S910, if the variable i reaches the total number of users "num" and the determination result is "NO" (NO in step S910), the processing proceeds to step S911. In step S911, EvalC[i] as the acquired evaluation values C of all users (i=0 to num-1) is returned to the log-in processing unit 204 as EvalC[num].

FIG. 10 is a flowchart illustrating calculation processing of the evaluation value D. This flowchart corresponds to the processing in step S506 in FIG. 5, and the processing is executed by branching from step S506.

In step S1001, a log in a holding state (a log in a printing queue) is extracted from the job list of the log-in processing unit 204. In step S1002, a total number of users is specified as "num". In step S1003, the variable i is initialized to 0. In step S1004, with respect to the user i (herein, i=0), the authentication priority order determination unit 203 executes searching to find out whether a print job in a holding state (i.e., a print job in an output queue) exists in the job list. If a print job exists in the holding state (YES in step S1004), the processing proceeds to step S1005. In step S1005, EvalD[i] as the evaluation value D of the user (i=0) is evaluated, for example, as 10 points. Herein, the evaluation value is set to 10 points because of a reason similar to the reason described in the calculation processing of the evaluation value B. On the other hand, if no print job exists in the holding state (NO in step S1004), the processing proceeds to step S1006. In step S1006, EvalD[i] as the evaluation value D of the user (i=0) is evaluated as 0.

In step S1007, the variable i is incremented to i+1 (herein, i=1). In step S1008, the authentication priority order determination unit 203 determines whether the incremented variable i is less than the number of users "num". If the determination result is "YES" (YES in step S1008), the processing in steps S1004 to S1008 is repeatedly executed with respect to the user (i=1), and the evaluation value D of the user (i=1) is acquired. Thus, the evaluation values D of the respective users are acquired sequentially.

In step S1008, if the variable i reaches the total number of users "num", and the determination result is "NO" (NO in step S1008), the processing proceeds to step S1009. In step S1009, EvalD[i] as the acquired evaluation values D of all users (i=0 to num-1) is returned to the log-in processing unit 204 as EvalD[num].

Hereinafter, an example of display order sorting processing based on the evaluation result will be described with reference to a practical case. A table 1 is an example of a prediction result of log-in evaluation values and display order of users. In this example, 12 users, "User1" to "User12", are to be evaluated.

TABLE 1

|  | Evaluation Value A | Evaluation Value B | Evaluation Value C | Evaluation Value D | Total Evaluation Value S | Display Order |
|---|---|---|---|---|---|---|
| User1 | 11 | 10 | 6 | 10 | 37 | 1 |
| User2 | 8 | 0 | 7 | 0 | 15 | 6 |
| User3 | 3 | 0 | 0 | 0 | 3 | 12 |
| User4 | 4 | 10 | 5 | 10 | 29 | 3 |
| User5 | 0 | 0 | 8 | 0 | 8 | 11 |
| User6 | 1 | 0 | 9 | 0 | 10 | 9 |
| User7 | 2 | 10 | 1 | 0 | 13 | 8 |
| User8 | 5 | 0 | 10 | 0 | 15 | 6 |
| User9 | 7 | 10 | 2 | 0 | 19 | 5 |
| User10 | 6 | 0 | 3 | 0 | 9 | 10 |
| User11 | 9 | 0 | 11 | 0 | 20 | 4 |
| User12 | 10 | 10 | 4 | 10 | 34 | 2 |

An evaluation value A of each user is a value according to a number of log-in times. A greatest evaluation value A is 11 points acquired by the User1, and the value is followed by the evaluation values A acquired by the User12, the User11, and so on. An evaluation value B is a value corresponding to a log-in state of one past day, and either 10 or 0 is assigned thereto. An evaluation value C is a value according to a total number of print jobs issued in the past. Herein, a greatest evaluation value C is acquired by the User11, and the value is followed by the evaluation values C acquired by the User8, the User6, and so on. An evaluation value D is a value corresponding to presence or absence of a print job in an output queue, and either 10 or 0 is assigned thereto. A total evaluation value S of each user represents a total of the evaluation values A to D.

A formula for calculating EvalS[i] representing the total evaluation value S is expressed as the following formula 1, and the value thereof is calculated by the authentication priority order determination unit 203 in step S507 in FIG. 5. Herein, "i" represents the identification number of the user.

$$EvalS[i]=evalA[i]+evalB[i]+evalC[i]+evalD[i] \quad (1)$$

A user having a greater total evaluation value (EvalS) is evaluated as a user having a higher possibility of executing log-in operation next time. Accordingly, the display order is preferentially determined in the order of higher total evaluation values.

Display order derived from the prediction result based on this evaluation is transmitted to the log-in processing unit 204, and the log-in processing unit 204 arranges and displays the user icons on the log-in screen according to that display order.

Figure 11A:
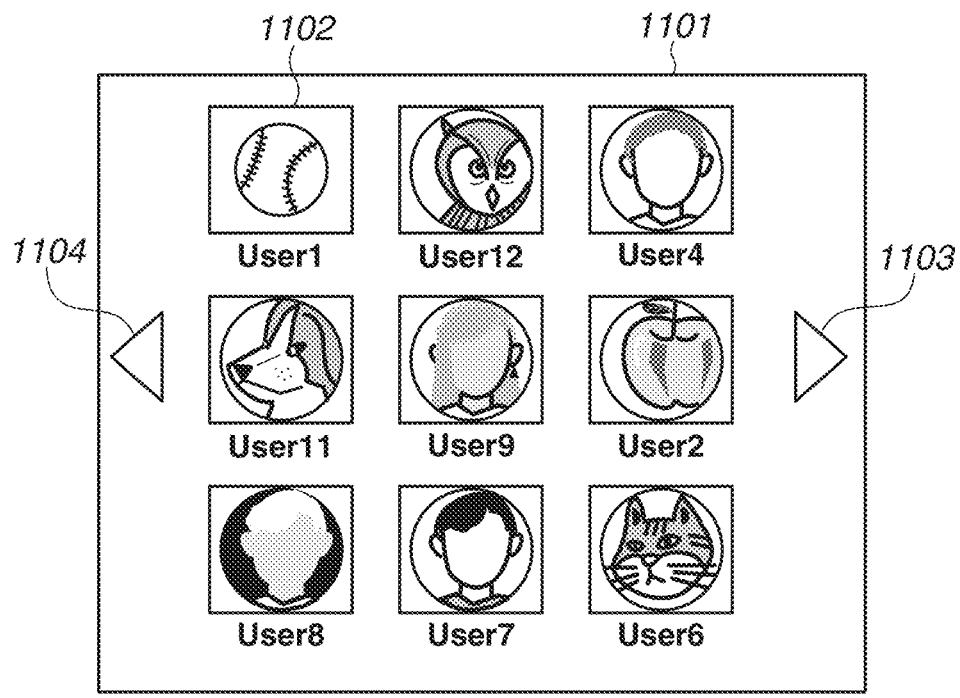
FIGS. 11A and 11B are diagrams illustrating examples of a log-in screen displayed on an operation unit when log-in operation is executed in a second exemplary embodiment.
Figure 11B:
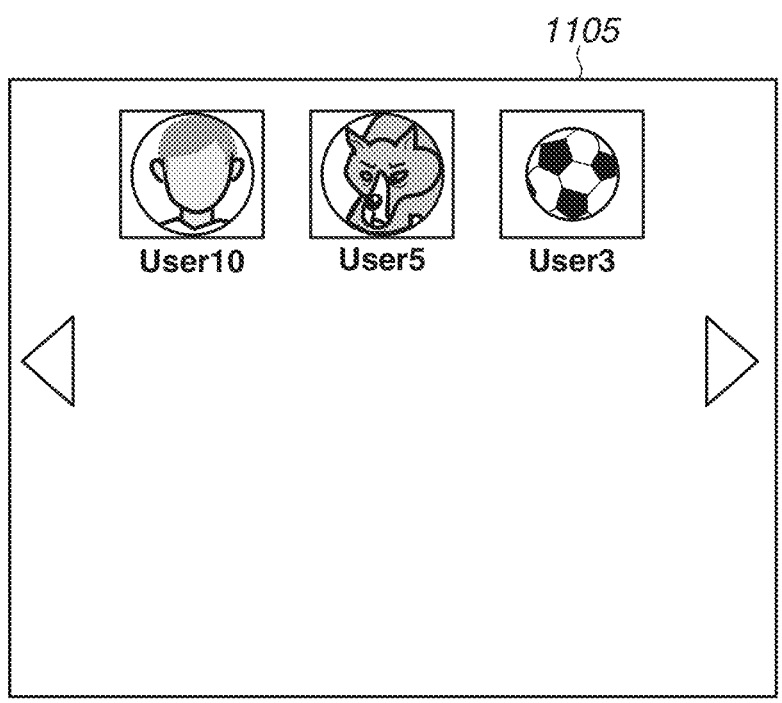

FIGS. 11A and 11B are user interface (UI) diagrams illustrating examples of a log-in screen displayed on the operation unit 117 when log-in operation is executed in a case where the user icons are sorted according to the display order described in the table 1. According to the determined display order, the user icons are displayed in the order from left to right, and from top to bottom. As for the icon which is not displayed on a first screen 1101, the user may press the page flipping button 1103 to shift the first screen 1101 to a next UI screen 1105.

An icon of the User12 which is not displayed unless the user flips the screen 301 in FIG. 3A is displayed at a second position in the first screen 1101 in FIG. 11A.

For example, while the User3 has executed log-in operation three times in the past, log-in operation and job transmission have not been executed the past one day. Therefore, the evaluation value thereof is lowered, so that the User3 cannot select the icon unless the UI screen is flipped to the next screen 1105 illustrated in FIG. 11B.

As described above, according to the present exemplary embodiment, an evaluation value of each user is acquired by using a combination of a plurality of evaluation criteria (evaluation factors) defined based on the usage history information, and priority order of users having high possibilities of using the image forming apparatus next time is determined according to the acquired evaluation value. Then, the authentication icons of the respective users are displayed on the log-in screen based on the determined priority order. In other words, the authentication icons of each user are displayed on the log-in screen consisting of a plurality of pages, in order of higher priority based on the priority order. As described above, the user icons are sorted and displayed according to the evaluation result based on the combination of the plurality of evaluation factors, so that it is more likely that a user who has a higher possibility of using the image forming apparatus next time may not have to flip the pages of the log-in screens. Accordingly, log-in operation can be executed, which is highly convenient for the user.

Hereinafter, a second exemplary embodiment will be described. In the first exemplary embodiment, priority order of users having a high possibility of using the image forming apparatus next time is predicted from the evaluation result based on the combination of the plurality of evaluation factors. In the first exemplary embodiment, respective evaluation factors are not weighted, so that evaluation is executed using uniform weighting values. However, appropriate evaluation factors may be different depending on how the image forming apparatus is used. For example, in one office, log-in operation may be executed frequently while operation of print jobs is executed less frequently. In such a case, as an evaluation factor, a number of log-in times needs to be prioritized over a number of times of print job issuance. In the present exemplary embodiment, a method for weighting evaluation factors will be described, which allows optimum prediction according to a usage pattern.

Figure 12:
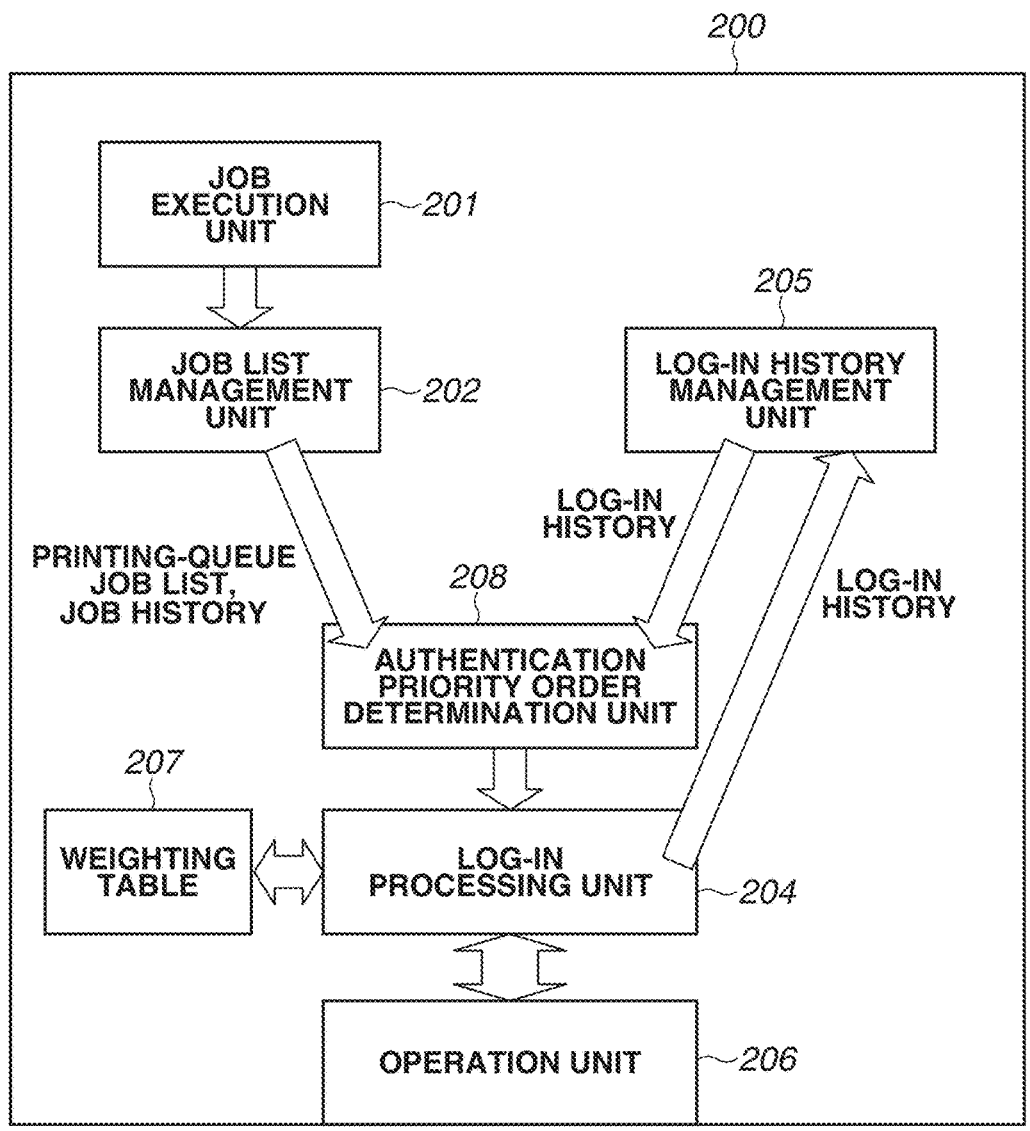
FIG. 12 a block diagram schematically illustrating a logical configuration of an image forming apparatus according to the second exemplary embodiment.

FIG. 12 is a block diagram illustrating a logical configuration mainly relating to the log-in processing of an image forming apparatus 200 of the present exemplary embodiment. A physical configuration of the image forming apparatus 200 in the present exemplary embodiment is similar to that of the configuration illustrated in FIG. 1. The logical configuration of the image forming apparatus 200 in FIG. 12 is different from the logical configuration of the image forming apparatus 100 in FIG. 2 in that the image forming apparatus 200 includes a weighting table 207, and that a function of an authentication priority order determination unit 208 is different from that of the authentication priority order determination unit 203 in FIG. 2. The other configurations are similar to the image forming apparatus 100 in FIG. 2, so that redundant description will be omitted.

The weighting table 207 includes weighting values of each evaluation table and is stored in a non-volatile memory such as an HDD. Each evaluation factor is weighted according to the weighting values. Each of the weighting values has a reference points (e.g., 10 points) as an initial value, and a weight is added to the points of each evaluation factor according to the weighting value. Further, a total of the weighting values assigned to the respective evaluation factors should always be constant (e.g., 40 points).

A formula for calculating a total evaluation value evalS[i] is expressed as the following formula 2, and the value is calculated by the authentication priority order determination unit 208 in step S1307 in FIG. 13 described below. Herein, "i" represents the identification number of the user.

$$evalS[i]=\text{Weight of Evaluation Factor } A \times evalA[i] + \\ \text{Weight of Evaluation Factor } B \times evalB[i] + \text{Weight} \\ \text{of Evaluation Factor } C \times evalC[i] + \text{Weight of} \\ \text{Evaluation Factor } D \times evalD[i] \quad (2)$$

FIG. 13 is a flowchart illustrating processing executed by the authentication priority order determination unit 208 of the present exemplary embodiment. The authentication priority order determination unit 208 starts the processing along with the activation of the image forming apparatus 200, and operates continuously and constantly until the power is shut off. Further, the processing is executed at the timing of the authentication priority order evaluation processing in step S403 of FIG. 4.

In FIG. 13, because the processing in steps S1301 to S1308 is similar to the processing in steps S501 to s508 in FIG. 5, redundant description will be omitted.

In addition, display order derived from the prediction result based on the total evaluation value (evalS[i]) of each user acquired in step S1307 is transmitted to the log-in processing unit 204 in step S1308. The log-in processing unit 204 arranges and displays the user icons on the log-in screen according to the display order.

In step S1309, the authentication priority order determination unit 208 checks whether log-in operation is executed by pressing an icon on the operation unit 206. If the determination result is "NO" (NO in step S1309), the processing returns to step S1309. If the determination result is "YES" (YES in step S1309), this indicates that an optional icon is selected through the operation unit 206. Therefore, in step S1310, the authentication priority order determination unit 208 determines whether the user has been able to select the icon without flipping the page.

If the user has been able to select the icon without flipping the page (YES in step S1310), this indicates that prediction according to the evaluation factors has succeeded. Therefore, the weighting value of the evaluation factor is corrected. This correction corresponds to weighting update processing executed in step S406 in FIG. 4. Specifically, in step S1311, from among the evaluation values A to D of the user corresponding to the selected icon, a correction value such as one is added to the weighting value of the evaluation factor having the highest evaluation points. Further, in step S1312, a correction value one is subtracted from the weighting value of the evaluation factor having the lowest evaluation points.

Thus, if the prediction has succeeded, a correction value is added to the weighting value of the evaluation factor, which has shown a high degree of contribution, while a correction value is subtracted from the weighting value of the evaluation factor, which has shown a low degree of contribution, so that prediction accuracy can be further raised.

If more than one evaluation factors have the highest evaluation points, the correction value is prorated by the number of evaluation factors of the same evaluation points, and the prorated correction value is added to the weighting value of each evaluation factor. Similarly, if more than one evaluation factors have the lowest evaluation points, the correction value is prorated by the number of evaluation factors of the same evaluation points, and the prorated correction value is subtracted from the weighting value of each evaluation factor.

On the other hand, in step S1310, if the user has been able to select the icon by flipping the page (NO in step S1310), this indicates that the prediction according to the evaluation factors has failed. Therefore, the weighting value of the evaluation factor is corrected. This correction corresponds to the weighting update processing executed in step S406 in FIG. 4. Specifically, in step S1313, from among the evaluation values A to D of the user corresponding to the selected icon, a correction value one is subtracted from the weighting value of the evaluation factor having the highest evaluation points. Further, in step S1314, a correction value one is added to the weighting value of the evaluation factor having the lowest evaluation points.

Thus, if the prediction has failed, a correction value is subtracted from the weighting value of the evaluation factor, which has shown a high degree of contribution, while a correction value is added or allocated to the weighting value of the evaluation factor, which has shown a low degree of contribution, so that the prediction accuracy can be further raised.

In addition, if more than one evaluation factors have the highest evaluation points, the correction value is prorated by the number of evaluation factors of the same evaluation points, and the prorated correction value is subtracted from the weighting value of each evaluation factor. Similarly, if more than one evaluation factors have the lowest evaluation points, the correction value is prorated by the number of evaluation factors of the same evaluation points, and the prorated correction value is added to the weighting value of each evaluation factor. When the processing in step S1312 or S1314 is completed as described above, the processing returns to step S1301.

Herein, the corrected weights of the evaluation points are written into the weighting table 207. Since the weighting table 207 is written into a non-volatile memory area, the values thereof are retained even after the power of the image forming apparatus 200 is shut off. The weighting values of respective evaluation factors written into the weighting table 207 are reflected when the processing is executed in step S1307 in the next prediction.

A prediction result when weighting is executed will be described below. A table 2 is an example of the prediction result after weighting correction according to the present exemplary embodiment is applied to the evaluation values in the table 1 of the first exemplary embodiment.

TABLE 2

| | Evaluation Value A | Evaluation Value B | Evaluation Value C | Evaluation Value D | Total Evaluation Value S | Weighting Correction | Display Order |
|---|---|---|---|---|---|---|---|
| Weighting Value | 10 | 10 | 10 | 10 | — | — | — |
| User1 | 11 | 10 | 6 | 10 | 37 | 370 | 1 |
| User2 | 8 | 0 | 7 | 0 | 15 | 150 | 6 |
| User3 | 3 | 0 | 0 | 0 | 3 | 30 | 12 |
| User4 | 4 | 10 | 5 | 10 | 29 | 290 | 3 |
| User5 | 0 | 0 | 8 | 0 | 8 | 80 | 11 |
| User6 | 1 | 0 | 9 | 0 | 10 | 100 | 9 |
| User7 | 2 | 10 | 1 | 0 | 13 | 130 | 8 |
| User8 | 5 | 0 | 10 | 0 | 15 | 150 | 6 |
| User9 | 7 | 10 | 2 | 0 | 19 | 190 | 5 |
| User10 | 6 | 0 | 3 | 0 | 9 | 90 | 10 |
| User11 | 9 | 0 | 11 | 0 | 20 | 200 | 4 |
| User12 | 10 | 10 | 4 | 10 | 34 | 340 | 2 |

In the table 2, a weighting value is added to each of the evaluation factors, so that evaluation is executed with weighted evaluation values. For example, while the evaluation value A of the User1 is 11 points, the weighted evaluation value A is evaluated as 110 points because the weighting value is 10 points. Similarly, the weighted evaluation values B, C, and D are evaluated as 100 points, 60 points, and 100 points respectively, so that the total evaluation value after the weighting correction is 370 points.

In the table 2, 10 points are assigned to the weighting values of all evaluation factors. Therefore, display order is the same as the table 1 because there is no difference in the weighting values.

It is assumed that the icon of the User1 is selected in the above-described state.

The User1 is ranked the first place in the preferential display order. Therefore, as illustrated in FIG. 11A, the User1 can select user's own icon without flipping the page. Accordingly, the determination result is "YES" in step S1310 in FIG. 13 and the processing branches to step S1311. Then, the correction value one is added to the weighting value of 10 points of the evaluation value A having 11 points as the highest evaluation point. Next, in step S1312, the correction value one is subtracted from the weighting value of 10 points of the evaluation value C having 6 points as the lowest evaluation point. As a result, the prediction result is changed as illustrated in the table 3.

the first screen. Therefore, the User6 has to flip the screen to display a next screen. On the other hand, since ranking of the User10 is changed from the 10th place to the 9th place, the icon is displayed on the first screen.

Next, processing executed when the user flips a page to select the icon will be described below. When the User10 selects the icon in a state where the prediction result of the table 2 is acquired, the User10 flips the page to select the icon because the icon of the User10 is not displayed on the first screen in FIG. 11A. Therefore, the determination result in step S1310 is "NO", so that the processing branches to step S1313. Then, a correction value one is subtracted from the weighting value of 10 points of the evaluation value A having 6 points as the highest evaluation point. Next, in step S1314, the correction value one is added to the weighting values of 10 points of the evaluation values B and D having 0 point as the lowest evaluation point. Herein, because the correction value is prorated to the evaluation values B and D, a correction value of 0.5 is added to each of the weighting

TABLE 3

| | Evaluation Value A | Evaluation Value B | Evaluation Value C | Evaluation Value D | Total Evaluation Value S | Weighting Correction | Display Order |
|---|---|---|---|---|---|---|---|
| Weighting Value | 11 | 10 | 9 | 10 | — | — | — |
| User1 | 11 | 10 | 6 | 10 | 37 | 375 | 1 |
| User2 | 8 | 0 | 7 | 0 | 15 | 151 | 6 |
| User3 | 3 | 0 | 0 | 0 | 3 | 33 | 12 |
| User4 | 4 | 10 | 5 | 10 | 29 | 289 | 3 |
| User5 | 0 | 0 | 8 | 0 | 8 | 72 | 11 |
| User6 | 1 | 0 | 9 | 0 | 10 | 92 | 10 |
| User7 | 2 | 10 | 1 | 0 | 13 | 131 | 8 |
| User8 | 5 | 0 | 10 | 0 | 15 | 145 | 7 |
| User9 | 7 | 10 | 2 | 0 | 19 | 195 | 5 |
| User10 | 6 | 0 | 3 | 0 | 9 | 93 | 9 |
| User11 | 9 | 0 | 11 | 0 | 20 | 198 | 4 |
| User12 | 10 | 10 | 4 | 10 | 34 | 346 | 2 |

In the table 3, since ranking of the User6 is changed from the 9th place to the 10th place, the icon is not displayed on values. As a result, the prediction result is changed as illustrated in the table 4.

TABLE 4

| | Evaluation Value A | Evaluation Value B | Evaluation Value C | Evaluation Value D | Total Evaluation Value S | Weighting Correction | Display Order |
|---|---|---|---|---|---|---|---|
| Weighting Value | 9 | 10.5 | 10 | 10.5 | — | — | — |
| User1 | 11 | 10 | 6 | 10 | 37 | 369 | 1 |
| User2 | 8 | 0 | 7 | 0 | 15 | 142 | 7 |
| User3 | 3 | 0 | 0 | 0 | 3 | 27 | 12 |
| User4 | 4 | 10 | 5 | 10 | 29 | 296 | 3 |
| User5 | 0 | 0 | 8 | 0 | 8 | 80 | 11 |
| User6 | 1 | 0 | 9 | 0 | 10 | 99 | 9 |
| User7 | 2 | 10 | 1 | 0 | 13 | 133 | 8 |
| User8 | 5 | 0 | 10 | 0 | 15 | 145 | 6 |
| User9 | 7 | 10 | 2 | 0 | 19 | 188 | 5 |
| User10 | 6 | 0 | 3 | 0 | 9 | 84 | 10 |
| User11 | 9 | 0 | 11 | 0 | 20 | 191 | 4 |
| User12 | 10 | 10 | 4 | 10 | 34 | 340 | 2 |

In the table 4, display order is changed, so that priority order of the User2 which is the 6th place in the table 2 is changed to the 7th place.

As described above, success or failure of prediction can be determined based on whether the page is flipped when the icon is selected. If the prediction has succeeded, a weighting value of the evaluation factor having the highest evaluation point with respect to the predicted user is increased, whereas a weighting value of the evaluation factor having the lowest evaluation point is decreased. With this configuration, display priority order can be moved up with respect to a user having a usage history with similar tendency.

If the prediction has failed, a weighting value of the evaluation factor having the highest evaluation point with respect to the predicted user is decreased, whereas a weighting value of the evaluation factor having the lowest evaluation point is increased. With this configuration, display priority order can be moved down with respect to a user having a usage history with similar tendency.

As described above, according to the present exemplary embodiment, priority order of users having high possibilities of using the image forming apparatus next time is determined by uniquely weighting the evaluation criteria (evaluation factors). The weighting value is corrected depending on whether the user has selected a higher-order authentication icon (e.g., an authentication icon displayed on the first page) or a lower-order authentication icon (e.g., an authentication icon displayed on the second page) when authentication operation for selecting user's own icon is executed via the log-in screen.

Because the weighting value is corrected every time log-in operation is executed, optimum display order in the relevant office can be determined in the course of operating the image forming apparatus. Accordingly, it becomes less likely that a user flips a page, and thus user-friendly simple authentication operation can be achieved.

In addition, the correction value may be a constant value, for example, one, even if the number of users is large, and thus the log-in screen consists of a large number of pages. Furthermore, a correction value, which is changed according to the number of pages flipped at the log-in operation may be set. For example, the greater correction value may be used when the number of flipped pages is greater, and the correction value may be 1.0, 1.1, or 1.3 if the number of flipped pages is 1, 2, or 3.

A third exemplary embodiment will be described below. In the second exemplary embodiment, reference points (e.g., 10 points) are given to the weighting value of each evaluation factor as an initial value, and the weighting values are saved in the weighting table 207. In the present exemplary embodiment, an adjustment unit for adjusting the weighting value is provided on the operation unit 206. By making an adjustment on the weighting value, a weighting value considered to be an optimum can be applied when initial installation is carried out.

Aspects of the present invention are also applicable to an image forming apparatus or a digital multifunction peripheral of another type as long as a function similar to that of the image forming apparatus of the present invention can be realized.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-189317, filed Sep. 29, 2017, which is hereby incorporated by reference herein in its entirety.

What is claimed is:

1. An image forming apparatus comprising:
one or more memories storing instructions; and
one or more processors that, upon executing the instructions, configures the one or more processors to:
manage usage history information about the image forming apparatus for each user;
determine an evaluation value for each user based on the usage history information using a plurality of different types of evaluation criteria applied to the usage history information, each evaluation criteria having unique weighting values applied thereto, and to determine a priority order based on the determined evaluation value that predicts which users will use the image forming apparatus next time; and
cause display of an authentication icon of each user on a log-in screen based on the priority order,
wherein the unique weighting value applied to each evaluation criteria is corrected based on determined priority order for a selected authentication icon when authentication operation is executed through the log-in screen.

2. The image forming apparatus according to claim 1, wherein, execution of the instructions further configures the one or more processors to, based on the priority order, cause display of the authentication icons on the log-in screen on a plurality of pages in order of higher priority.

3. The image forming apparatus according to claim 1, wherein the usage history information includes a log-in history of the image forming apparatus.

4. The image forming apparatus according to claim 3, wherein one of the plurality of evaluation criteria is a number of times of log-in to the image forming apparatus by each user.

5. The image forming apparatus according to claim 1, wherein the usage history information includes a job history of a host computer with respect to the image forming apparatus.

6. The image forming apparatus according to claim 5, wherein one of the plurality of criteria is a number of times each user transmits print jobs to the image forming apparatus.

7. The image forming apparatus according to claim 5, wherein one of the plurality of criteria is presence or absence of a print job of each user yet to be output.

8. The image forming apparatus according to claim 1,
wherein execution of the instructions further configures the one or more processors to, calculate the evaluation value for each user through certain calculation of a plurality of evaluation criteria based on the usage history information, and
cause display of authentication icons of users on the log-in screen in order of higher calculated evaluation values.

9. A control method of an image forming apparatus comprising:
managing usage history information about the image forming apparatus for each user;
determining an evaluation value for each user based on the usage history information, using a plurality of different types of evaluation criteria applied to the usage history information each evaluation criteria having unique weighting values applied thereto, and determining a priority order based on the determined evaluation value that predicts which users will use the image forming apparatus next time;
displaying an authentication icon of each user on a log-in screen based on the priority order; and
correcting the unique weighting value applied to each evaluation criteria based on determined priority order for a selected authentication icon when authentication operation is executed through the log-in screen.

10. The method according to claim 9, wherein based on the priority order, displaying the authentication icons on the log-in screen on a plurality of pages in order of higher priority.

11. The method according to claim 9, wherein the usage history information includes a log-in history of the image forming apparatus.

12. The method according to claim 11, wherein wherein one of the plurality of evaluation criteria is a number of times of log-in to the image forming apparatus by each user.

13. The method according to claim 9, wherein the usage history information includes a job history of a host computer with respect to the image forming apparatus.

14. The method according to claim 13, wherein one of the plurality of criteria is a number of times each user transmits print jobs to the image forming apparatus.

15. The method according to claim 13, wherein one of the plurality of criteria is presence or absence of a print job of each user yet to be output.

16. The method according to claim 9, further comprising
calculating the evaluation value for each user through certain calculation of a plurality of evaluation criteria based on the usage history information, and
displaying authentication icons of users on the log-in screen in order of higher calculated evaluation values.

17. A non-transitory computer-readable storage medium storing a program which causes an image forming apparatus to execute a method, the method comprising:
managing usage history information about the image forming apparatus for each user;
determining an evaluation value for each user based on the usage history information using a plurality of different types of evaluation criteria applied to the usage history information, each evaluation criteria having unique weighting values applied thereto, and determining a priority order based on the determined evaluation value that predicts which users will use the image forming apparatus next time;
displaying an authentication icon of each user on a log-in screen based on the priority order; and
correcting the unique weighting value applied to each evaluation criteria based on determined priority order for a selected authentication icon when authentication operation is executed through the log-in screen.

* * * * *